(12) United States Patent
Schaefer

(10) Patent No.: US 7,108,222 B1
(45) Date of Patent: Sep. 19, 2006

(54) FILM REEL

(75) Inventor: Robert J. Schaefer, Tustin, CA (US)

(73) Assignee: Circular Motion Products, Downey, CA (US)

( * ) Notice: Subject to any disclaimer, the term of this patent is extended or adjusted under 35 U.S.C. 154(b) by 193 days.

(21) Appl. No.: 10/841,667

(22) Filed: May 10, 2004

(51) Int. Cl.
B65H 75/14 (2006.01)

(52) U.S. Cl. .................................. 242/608.6
(58) Field of Classification Search ............. 242/608.6, 242/118.61
See application file for complete search history.

(56) References Cited

U.S. PATENT DOCUMENTS

| 5,114,089 | A | 5/1992 | Posso |
| 5,676,332 | A | 10/1997 | Kraus et al. |
| 5,775,634 | A | 7/1998 | Fettes et al. |
| 6,702,228 | B1 | 3/2004 | Zide et al. |
| 6,857,595 | B1* | 2/2005 | Schaefer .................. 242/608.5 |

* cited by examiner

Primary Examiner—John Q. Nguyen
(74) Attorney, Agent, or Firm—Charles H. Thomas

(57) ABSTRACT

A motion picture reel is provided with releaseably engageable and disengageable components including a pair of identical, laterally confining retaining members and a hub located therebetween. The retaining members and the hub are all separable from each other. Each retaining member has a prong with a catch on it and a latching member with a latch defined on it located diametrically opposite the prong. The latching members each have radially outwardly diverging side walls. The latching members fit snugly into truncated sector-shaped cavities formed between radial spoke partitions between the central core and the rim of the hub. Stiffening webs extended transversely across the hub between some of the spoke partitions and have apertures in them that allow passage of the prongs through the stiffening webs and into engagement with the latching lips of the latching projections beyond. The tips of the prongs are accessible for release through the open bases of the latching members.

17 Claims, 7 Drawing Sheets

FILM REEL

BACKGROUND OF THE INVENTION

1. Field of the Invention

The present invention relates to motion picture reels upon which motion picture film is wound and unwound as it is passed through a motion picture projector for presentation of a motion picture to a viewing audience.

2. Description of the Prior Art

Motion pictures are created by a series of photographs taken rapidly in sequence and arranged on a length of film. The film is wound on a motion picture reel and fed through a motion picture projector at a predetermined speed that is rapid enough to produce the illusion of actual movement of the figures in the sequence of photographs as the photographs are projected on the screen. The film is wound on the motion picture reel in a helical fashion about a hub that is fixed between a pair of much larger, narrow, planar retaining members. As film is advanced through the projector it is pulled off of one reel, advanced through the projector, and wound on a take-up reel. At the conclusion of presentation of the motion picture, the film is rewound back onto the original reel from which it was drawn during the presentation process.

In the motion picture industry, motion pictures are timed for release at a great number of locations during and immediately following very expensive promotional advertising campaigns. To maximize the number of viewers in the audiences, a great number of copies of a motion picture are created and are then distributed concurrently to numerous different movie theaters at the height of interest created by the advertising campaign. This distribution technique necessitates the creation of a great number of copies of each motion picture at the time of distribution. Each copy requires a separate, dedicated motion picture film reel.

During and immediately following the period of advertising promotion, a motion picture is widely exhibited at many different locations at the same time. Following the promotional period, however, the multitude of copies of the motion picture film produced and previously required are no longer necessary, and indeed, constitute a problem.

It is highly desirable for excess copies of motion picture films to be destroyed rather than stored. Films to be stored for later use must be maintained under hermetically sealed conditions so as to avoid degradation of the film copy. While certainly a limited number of copies of the film are preserved for possible recirculation and for use as masters for the possible reproduction of additional copies at a future time, the great majority of the copies of motion pictures produced are destroyed following a limited period of wide-spread exhibition in movie theaters.

There are several reasons for destroying the many copies of a motion picture film that are no longer required after the initial period following release of the film. The expense of storing the very large number of copies which were once necessary in order to exhibit the motion picture at a multitude of different movie theaters cannot be justified. The cost of protection and storage of each copy of the motion picture film far outweighs the incremental cost of producing another motion picture copy should another copy be required. Moreover, when copies of motion picture films are stored they must be safeguarded against misappropriation. As a consequence, destruction of the excess number of copies of a motion picture film following release and circulation is a highly desirable alternative to storage.

Originally, motion picture film reels were made of metal. At the time of destruction the motion picture film was drawn off of such a reel and cut into small, unusable pieces for disposal. However, this was a very time consuming, and therefore expensive process.

Because of the lengthy time required to unwind a copy of a motion picture film for destruction, quicker destruction methods were devised. One method was to construct the reel upon which the film was wound of a plastic material that could be broken in order to retrieve the film for destruction without unwinding it when the copy of the film became redundant. As a consequence, the film did not have to be pulled lengthwise off of the reel by rotating the reel for a lengthy period of time, but instead could be pulled transversely off of the hub and destroyed without unwinding it.

However, since the film reel had to be made strong enough to withstand repeated transport and use and reuse during exhibition of the motion picture, the reel had to be constructed in a reasonably sturdy manner. As a result, smashing of the reel was laborious and also at times difficult. Moreover, the cost of replacing these reels for use with other motion picture films was considerable.

More recently, motion picture reels have been produced which are formed of component members that are releaseably attached to each other. These conventional members include a pair of circular retaining plates and a much smaller central hub which can be releaseably fastened together. Originally the two retaining portions of the reel were screwed together. When the copy of the motion picture film wound thereon was no longer desired, the components of the reel were unscrewed from each other to provide complete access to the film wound on the central hub. However, the parts of this type of reel could accidentally become unscrewed during the time the film was in distribution.

A further type of motion picture film reel is now being produced in which the two halves of the motion picture reel include interlocking fingers at the hub that flex resiliently to interlock with a corresponding structure projecting from the other half of the reel. These two retaining members each include a metal insert into which a key is inserted. When the key is rotated, the fingers are deflected from engagement with the other portion of the reel, so that the two reel portions can be pulled apart. Each of the reel halves also includes either portions of an integrally formed hub portion upon which the film is wound or a hub insert. In either case a key is necessary to work within the metal insert so as to detach the reel halves from each other.

With this conventional design, the metal insert becomes a problem in ultimately disposing of such reels once they have outlived their useful lives. The metal insert cannot be readily separated from the plastic. Therefore, recycling of the plastic portion of the reel, which represents by far the greater portion of the structure of the reel, becomes very difficult since the metal insert must first be removed.

A significant advance in the construction of motion picture film reels was achieved in prior U.S. Pat. No. 5,676,332 issued Oct. 14, 1997. That patent describes a completely recyclable motion picture film reel, formed completely of plastic and having component parts that are releaseably attached together. In the structure of the device of that prior patent a pair of side retainers each formed of a generally flat, planar member are provided with a pair of resilient prongs defining catches thereon. These prongs are diametrically opposed to each other and extend through the hollow core of a hub so that the catches at the ends of the prongs releaseably engage the far side of the hub. The prongs of each of the side retainers are angularly displaced ninety degrees from the prongs of each other side retainer and pass through channels defined in the base of the other side retainer so that the side retainers are immobilized relative to each other as well as relative to the hub. However, for larger reels there is a tendency for the prongs to break off since they can be subjected to considerable stress if torsional forces are exerted on the side retainers.

In U.S. Pat. No. 5,775,634 issued Jul. 7, 1998 this problem was addressed and solved by providing the hub-engaging region with a pair of rigid posts having catches formed thereon that engage circular openings in the web of the motion picture reel hub. While this provides a much sturdier arrangement, one further problem that has persisted has been the tendency for a certain amount of play to exist in the angular alignment of the laterally confining retaining members. That is, the retaining members on the opposing sides of the reel can be twisted slightly relative to each other, thereby causing stress on the posts that project from the retaining members to engage the openings in the hub. Such stress can cause the posts to break.

SUMMARY OF THE INVENTION

The present intervention involves a motion picture reel having detachable components but constructed in such a manner as to prohibit any significant relative angular movement between the laterally confining side retainers. This is achieved by constructing each laterally confining retainer with a latching member that projects outwardly away from the hub-engaging region to serve not only as a latch for the catch of a prong projecting from the other laterally confining retainer, but also as a plug or key that fits snugly into a corresponding cavity defined in the motion picture wheel hub.

The plastic hubs employed in the commercially available recyclable motion picture reels having separable and releaseably engageable components are quite standardized in the motion picture industry. More specifically, the hubs for commercial motion picture reels are disc-shaped structures 3.4 cm in thickness and having an outer rim diameter of ten centimeters and an inner core diameter of 2.6 cm. There are eight hub spoke partitions that extend between the core and the rim and transverse webs bisect the spoke partitions and are oriented perpendicular to the hub axis of rotation so that eight cavities are defined on each side of the hub. The cavities are of a uniform size and are shaped as truncated sectors of a circle bounded on one side by the inner surface of the rim of the hub.

Each of the laterally confining retaining members is formed with a prong projecting outwardly from a hub-engaging region thereof a radially spaced distance from the axis of rotation of the retaining member and also a diametrically opposed latching member. The latching member defines an engageable latch at the same distance from the axis of rotation as the prong, and also defines a plug or key, which is a box shaped structure having a truncated, sector-shaped configuration that fits snugly into a corresponding cavity in the hub. The two retainers are disposed to face each other from opposite sides of the hub with the prong of each one aligned with the latching member of the other. The two latching members project toward the transverse webs of the hub from opposing sides so as to fit into the truncated, sector-shaped cavities of the hub. Openings in the webs of the hub allow passage of the prongs through the webs from opposing sides thereof so that catches on the prongs are releaseably engageable in latch openings formed in the latching members.

In one broad aspect the present intervention may be considered to be a motion picture film reel having an axis of rotation and formed of separable and releaseably engageable components including a pair of laterally confining retaining members and a hub. Each of the laterally confining retaining members includes a flat portion that defines a central, hub-engaging region and a retainer rim having a circular perimeter concentrically surrounding the hub-engaging region. Each retaining member has a resilient prong. The prongs are spaced radially from the axis of rotation of the motion picture reel. Each of the prongs projects away from the hub-engaging region of the laterally confining retaining member upon which it is formed and includes a catch thereon.

A latching member is located diametrically opposite the prong on each laterally confining retaining member and defines an engageable latch at the same radial distance from the axis of rotation as the prong. Each latching member also defines a pair of radially outwardly diverging side walls located on opposing sides of the latch.

The hub has opposing edges and a rim with a cylindrical outer surface, a central core, and a plurality of radial partitions forming spokes between the core and the rim. The spokes divide the space between the core and the reel rim into a plurality of truncated, arcuate sectors. The hub is positioned between the hub-engaging regions of the retaining members while the retaining members are rotated relative to each other about the axis of rotation 180 degrees. The retaining members are pressed into contact with the opposing edges of the hub with the prongs directed toward the latching members. The catches engage the latches and the side walls of the latching members fit between and reside in face to face contact with a diametrically opposed adjacent pair of the radial partitions within the hub.

Because the radially outwardly diverging side walls of the latch member are disposed in juxtaposition against adjacent radial partitions of the hub, the laterally confining retaining members are both constrained from any significant rotation relative to the hub, and are thereby constrained from any significant rotation relative to each other.

In another broad aspect the intervention may be considered to be a motion picture film reel comprising separable components that are releaseably engageable together including: a pair of film retainers and a disc-shaped hub. Each of the film retainers is formed as a flat member with interior and exterior faces. Each film retainer has an outer rim with a circular perimeter and a hub-engaging region on its interior face. Each film retainer defines an axis centered within the rim.

Each hub-engaging region includes a resilient prong radially offset from the axis and extending out from the hub-engaging region. Each prong has a catch thereon. A diametrically opposed latching projection extends out from each hub-engaging region. Each latching projection defines thereon a latch lip at the same radial distance from the axis as the catch of each prong. Each latching projection also defines a pair of angularly spaced radially extending side walls with a latch lip located therebetween.

The disc-shaped hub has a rim with opposing circular edges, a central core, and a plurality of uniformly spaced spoke partitions joining the core to the rim. The spoke partitions are angularly spaced from each other to define a plurality of truncated circular sectors therebetween. The film retainers face each other and are angularly oriented in diametric opposition from each other so that the prong on each film retainer projects toward and is aligned with the latching projection of the other film retainer.

The hub is positionable between the film retainers so that the prongs project between spoke partitions of the hub. The prongs also project between the side walls of the latching projections and are resiliently engageable with the latch lips while the side walls of the latching projections are disposed between and in face to face contact with spoke partitions of the hub when the circular edges of the hub rim reside in contact with the hub-engaging regions of the side retainers.

In still another broad aspect the invention may be considered to be a motion picture film reel comprising a pair of retaining members and a central hub. The retaining members are each formed with a flat plate member having a central axis of rotation and a hub-engaging region surrounding the central axis. Each retaining member also has a peripheral region having a circular outer perimeter lying beyond and surrounding the hub-engaging region.

Each of the retaining members has a resilient prong with a catch formed thereon. Each prong is radially spaced from the axis of rotation and projects out from the flat plate. A hollow, raised stabilizing plug having a latching opening defined therein and radially outwardly diverging side walls projects outwardly from each hub-engaging region.

The central hub has a cylindrical, peripheral rim, a cylindrical core, and a plurality of flat, radial spoke partitions. The spoke partitions join the core to the rim and define a plurality of truncated sector-shaped socket openings therebetween.

The retaining members are positionable with the flat plate members in mutually parallel alignment and rotated 180 degrees relative to each other about the axis of rotation. The hub is positionable between the hub-engaging regions of the retaining members. When the retaining members are pushed toward each other to contact the hub, the plugs of the retaining members fit snugly into diametrically opposed sockets of the hub. The catches on the prongs engage the latching openings of the plugs so that the retaining members are releaseably engaged with each other and with the hub located therebetween.

The film retainers are preferably identical to each other in construction so that all film retainers are interchangeable with each other. The latching projections are preferably formed as hollow boxes, open at their bases with radially outwardly diverging side walls. Latching projection end walls extend between the radially outwardly diverging side walls at both ends thereof. The latching projections form an enclosure laterally bounded by the radially extending side walls and by the radial inner and radial outer latching projection end walls. The enclosures of the hollow boxes preferably are formed with tops having openings therein that define the latch lips.

The invention may be described with greater clarity and particularity by reference to the accompanying drawings.

DESCRIPTION OF THE EMBODIMENT

Figure 1:
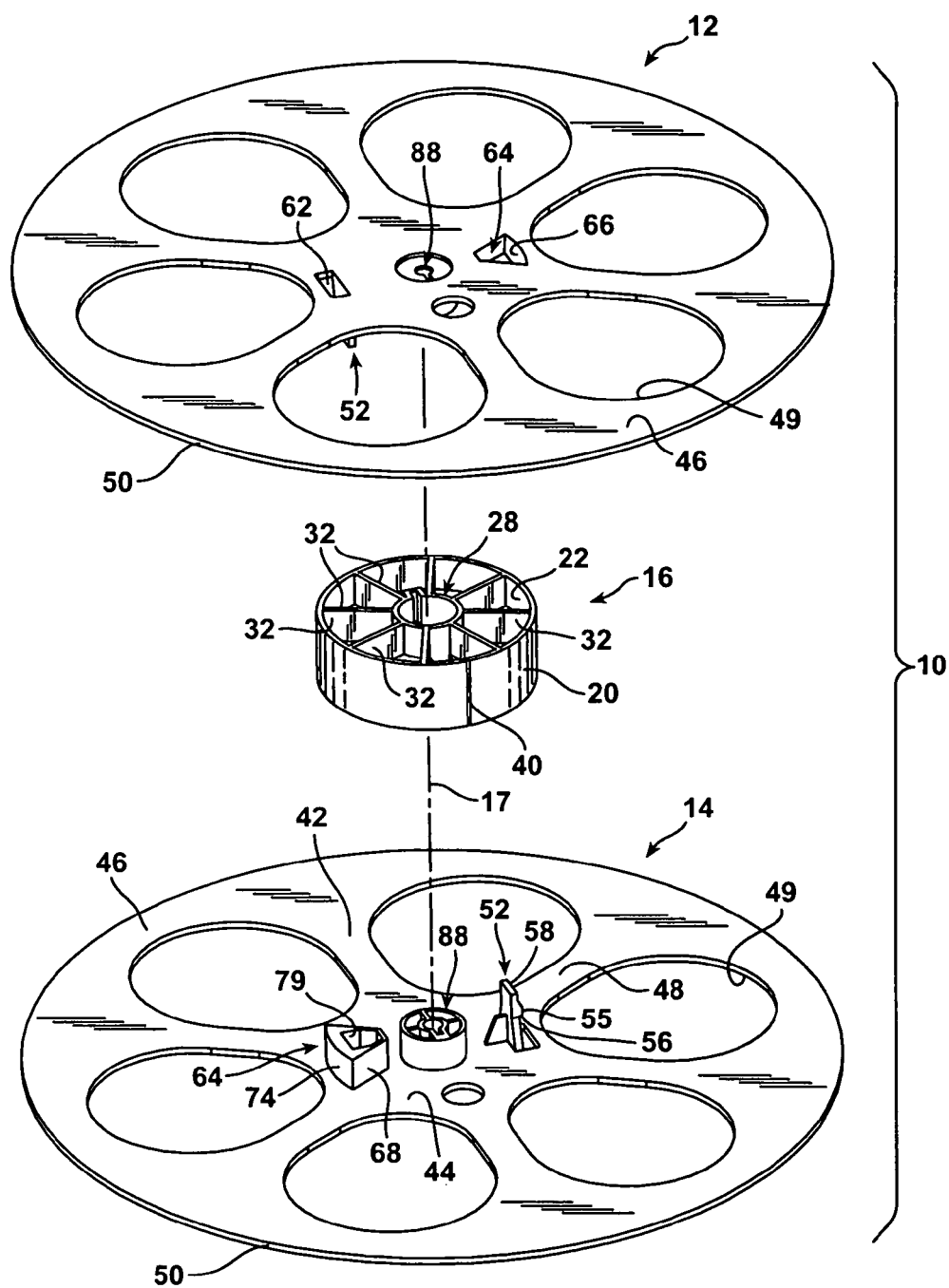
FIG. 1 is an exploded perspective view illustrating a preferred embodiment of a motion picture reel according to the invention.
Figure 2:
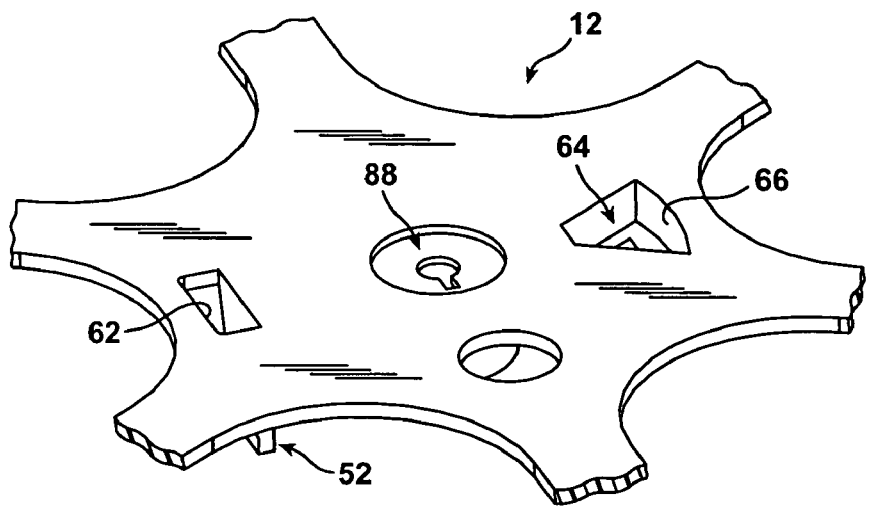
FIG. 2 is a perspective detail of the center of the outer surface of one of the laterally confining retaining members of the motion picture reel of FIG. 1

FIG. 1 illustrates a motion picture film reel 10 constructed according to the present invention. The motion picture film reel 10 is comprised of a pair of structurally identical, laterally confining retaining members 12 and 14 and a hollow, generally disc-shaped hub 16 located therebetween. All of the components members 12, 14, and 16 of the motion picture film reel 10 are formed of acronitrile-butadiene-styrene (ABS).

Figure 8:
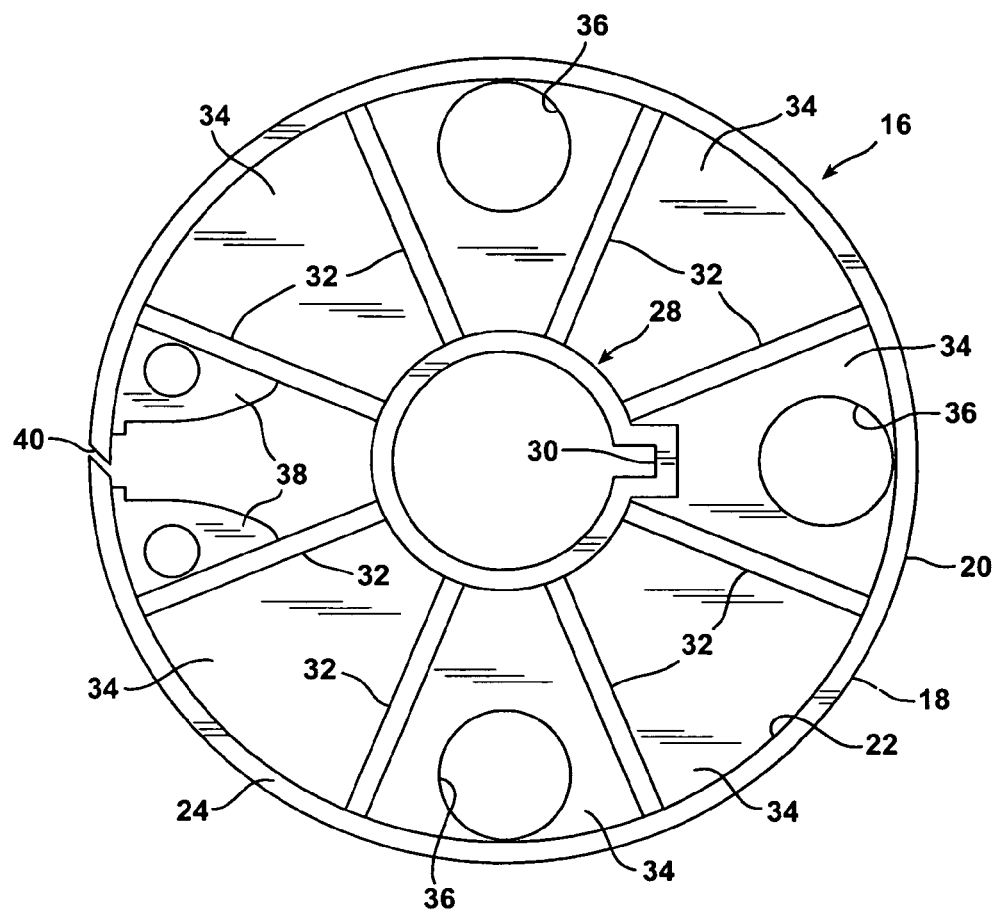
FIG. 8 is a plan view of the motion picture reel hub employed in the motion picture reel of the invention, shown in isolation.

The centrally located hub 16 of the type utilized in the motion picture industry has a very standardized construction. The hub 16 is illustrated in isolation in FIG. 8. The hub 16 has an outer, cylindrical, annular rim 18 having an outer surface 20 that is 10 cm in diameter and an inner surface 22. The encircling rim 18 has opposing edges 24 and 26 and the hub 16 is 3.4 cm in thickness as measured between the opposing, circular edges 24 and 26.

At its center the hub 16 is provided with a substantially cylindrical, annular core 28 having an internal diameter of 2.5 cm with a radially outwardly directed, generally rectangular keyway 30 formed to receive a driving key from a film reel drive mechanism. The rim 18 is set radially out from the core 28 and is joined thereto by eight uniformly spaced, spoke partitions 32 that extend between the inner surface 22 of the outer rim 18 and the outer surface of the core 28. Transverse, sector-shaped web partitions 34 are oriented perpendicular to the axial alignment of the rim 18 and the core 28 midway between the opposing edges 24 and 26 of the rim 18.

The radial spoke partitions 32, together with the web partitions 34, divide the space between the rim 18 and the core 28 into eight cavities shaped as truncated circular sectors on each side of the web partitions 34. Each of the truncated sector-shaped cavities is bounded by the inner surface 22 of the rim 18, the outer surface of the core 28, and mutually facing surfaces of adjacent ones of the radially outwardly diverging spoke partitions 32.

Three of the transverse webs 34 are formed with three circular apertures 36 defined therein. The apertures 36 through the web partitions 34 are spaced ninety degrees apart and are located immediately adjacent the inner surface 22 of the hub rim 18. A pair of the apertures 36 are located diametrically opposite each other, while the third apertures 36 is angularly offset ninety degrees between the other two apertures 36 and in radial alignment with the keyway 30.

Directly opposite the keyway 30 and between adjacent spoke partitions 32 there are a pair of small, generally triangular-shaped tabs 38 through which small apertures are formed. The tabs 38 lie on opposite sides of a film slot 40 defined across the width of the hub 16 in the outer rim 18 thereof. The film slot 40 resides at approximately the center of the sector delineated by the adjacent spoke partitions 32, the rim 18 and the core 28. In this region the transverse web is discontinuous so as to permit insertion of the end of a strip of film through the film insertion slot 40.

The laterally confining retaining members 12 and 14 are identical to each other and differ from each other only in orientation. Each of the laterally confining retaining members 12 and 14 includes a flat portion 42 that defines a central, hub-engaging region 44 on its interior surface and a retainer rim 46 located at its radial outer extremity. The flat portion 42 also defines a connecting intermediate portion that extends radially outwardly from the hub-engaging regions 44 to form retainer rim spokes 48 separated by large, oblong openings 49 therebetween. The retainer rim 46 has a circular outer perimeter 50 concentrically surrounding the hub-engaging region 44. Each retaining member 12 and 14 is centered on a common axis of rotation 17.

Figure 3:
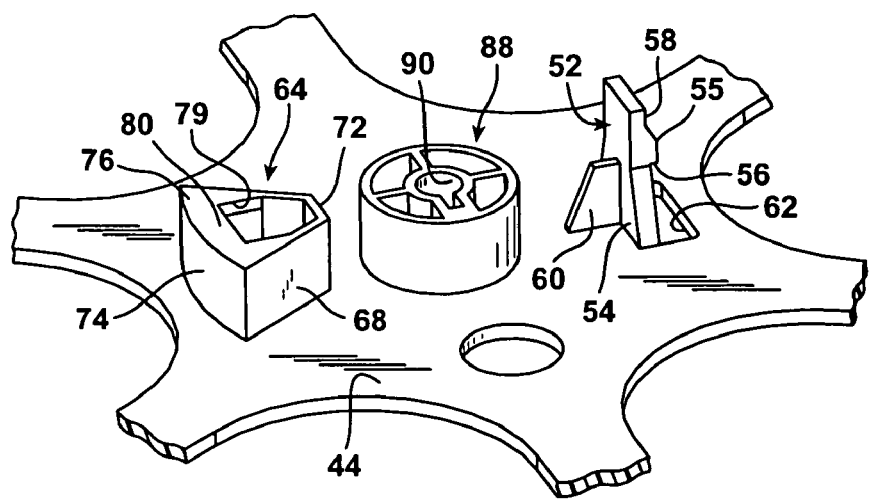
FIG. 3 is a perspective detail of the inner, hub-engaging surface of one of the laterally confining retaining members shown in FIG. 1.
Figure 4:
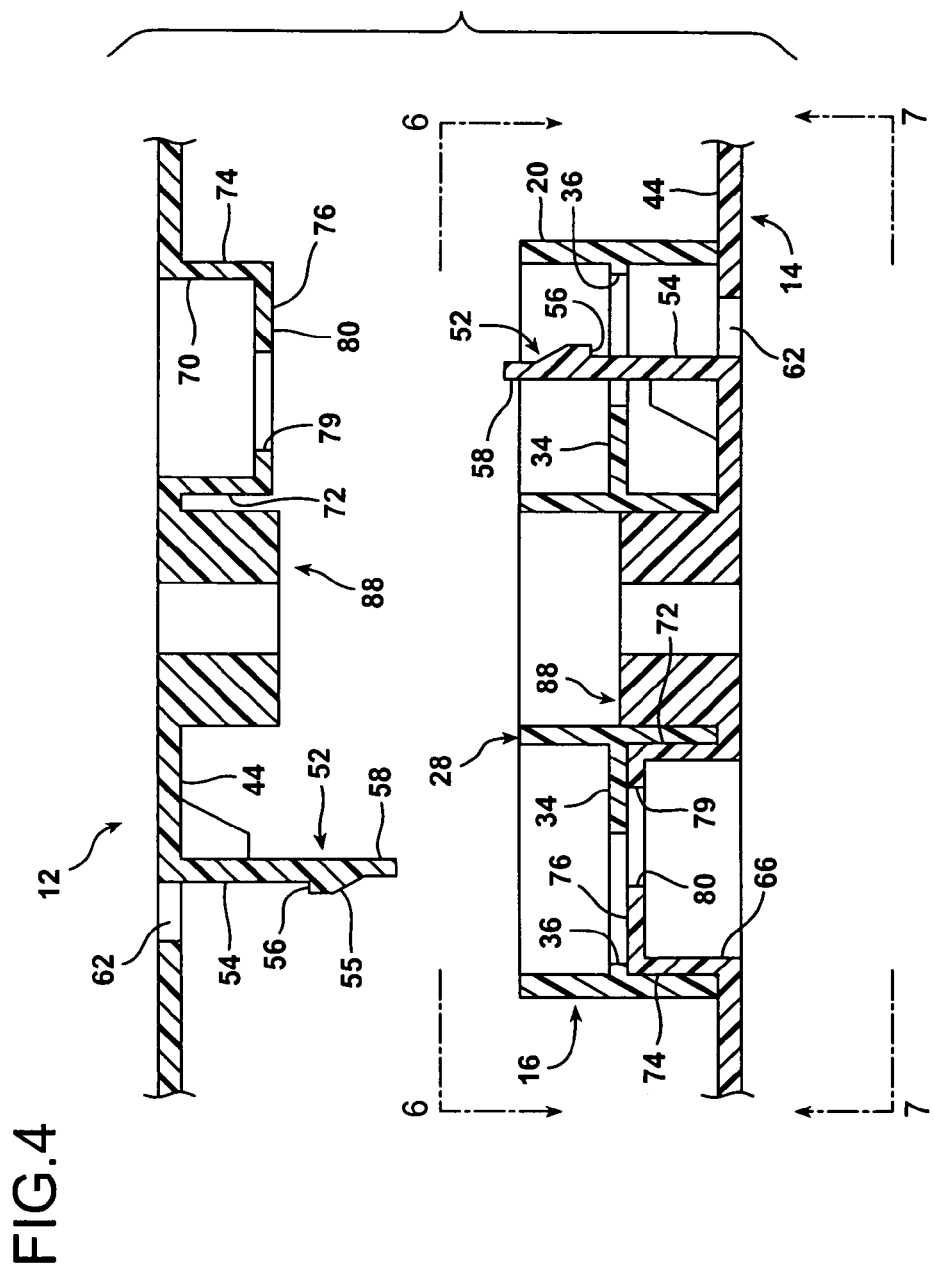
FIG. 4 is an exploded, sectional, elevational detail showing the component members of the motion picture reel of FIG. 1 prior to completed assembly.
Figure 5:
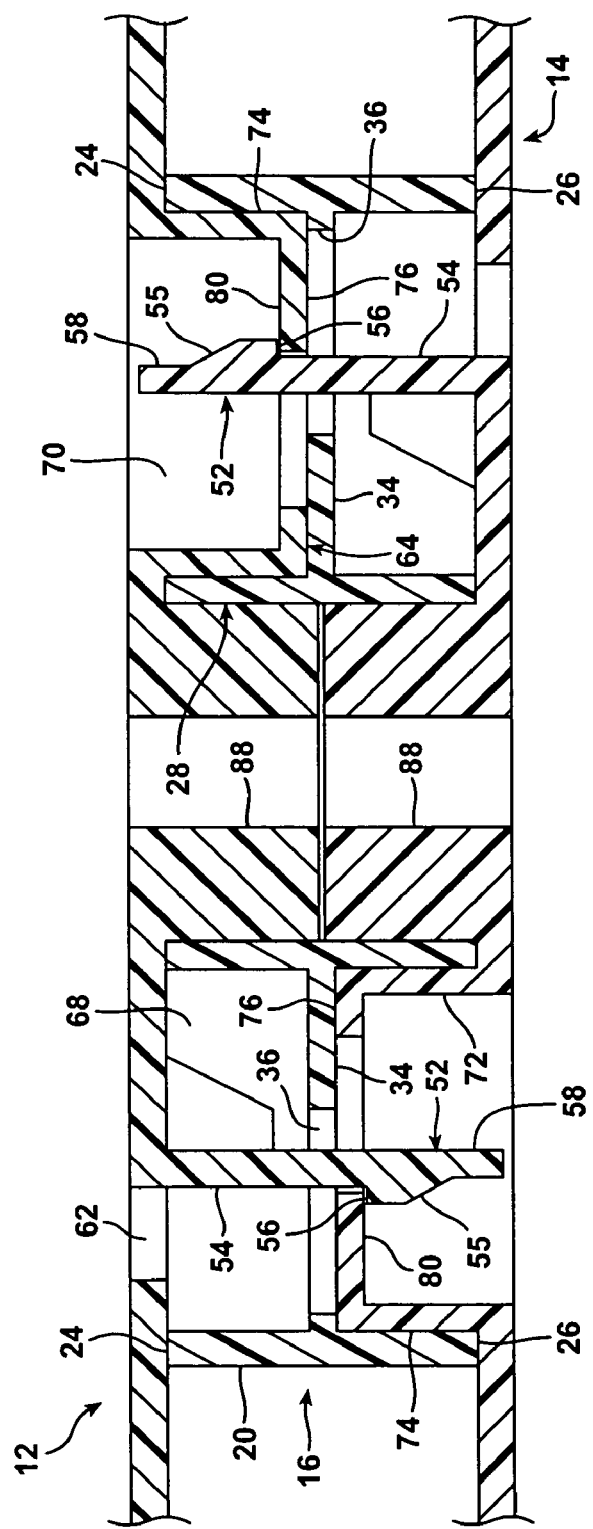
FIG. 5 is a sectional elevational detail illustrating the components of FIG. 4 releaseably engaged together.
Figure 6:
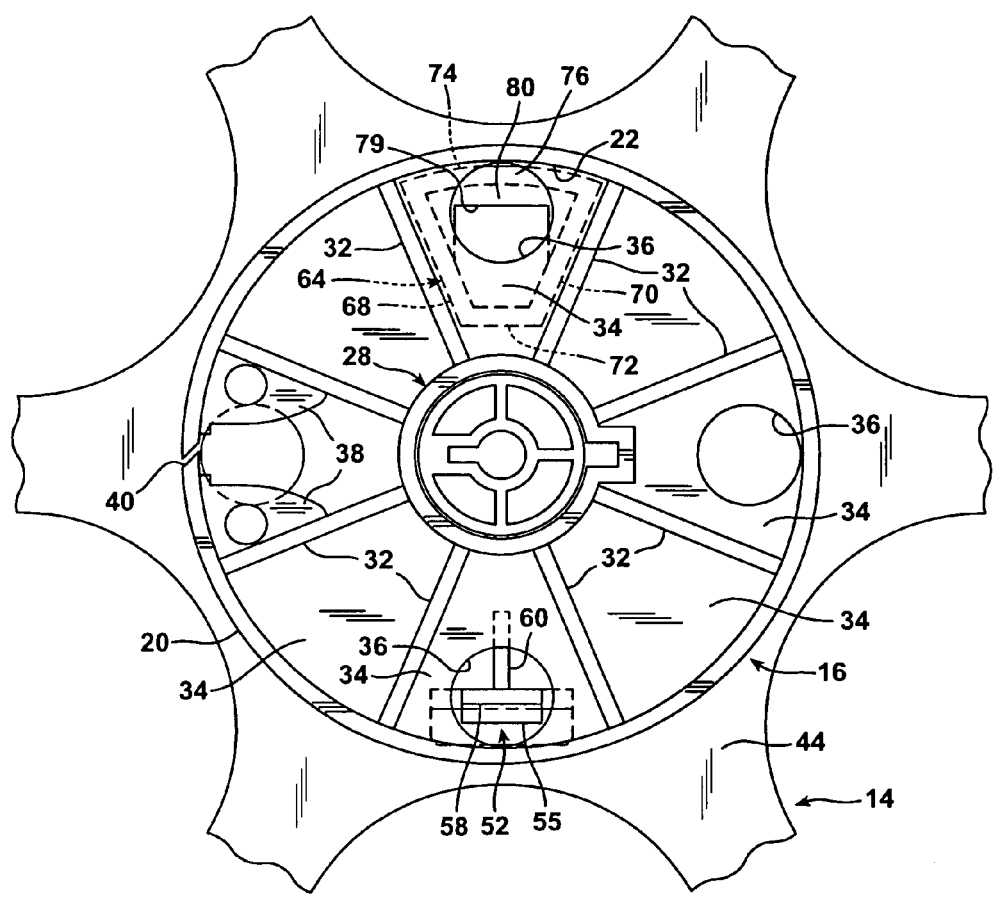
FIG. 6 is a top plan view taken along the lines 6—6 in FIG. 4.
Figure 7:
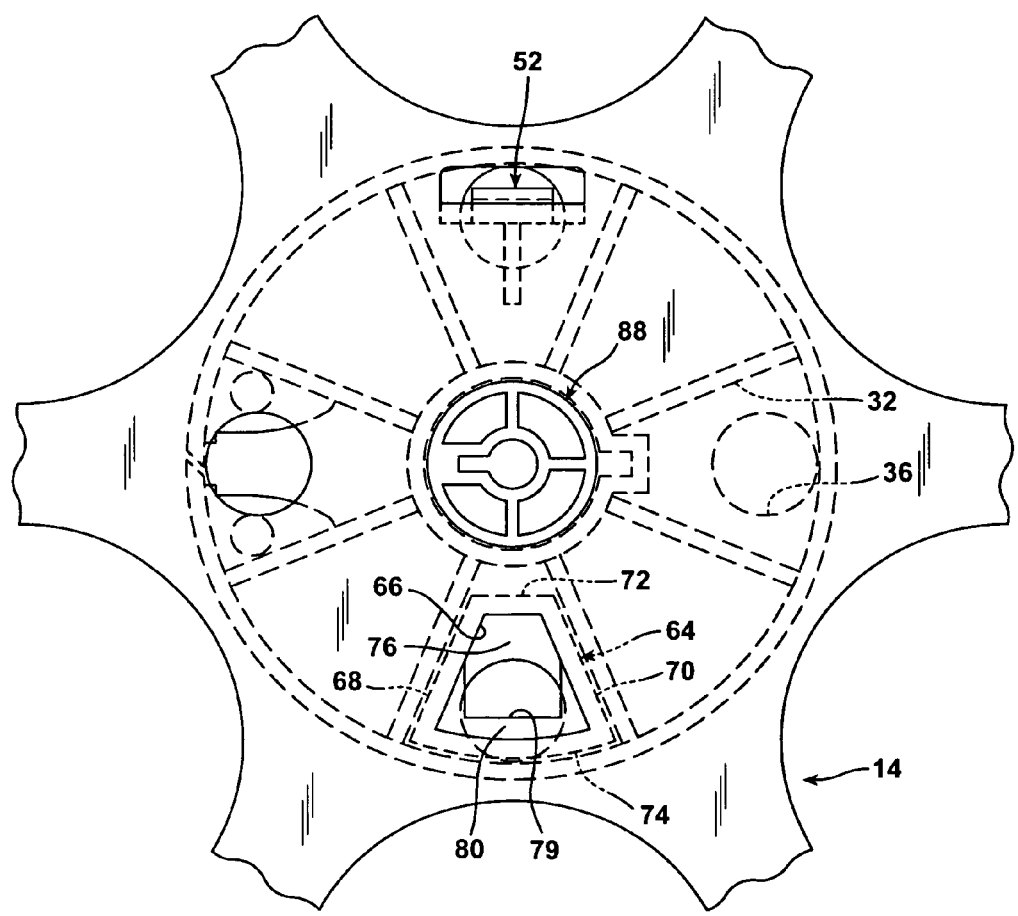
FIG. 7 is a bottom plan view taken along the lines 7—7 in FIG. 4.

A resilient prong 52 is formed on the hub-engaging region 44 of each of the retaining rims 12 and 14. The prong 52 is spaced radially from the axis of rotation 17 and projects away from the hub region 44, in perpendicular orientation thereto, as illustrated in FIGS. 3, 4 and 5. Each of the prongs 52 has a proximal stem 54 that extends outwardly perpendicular to the hub-engaging regions 44 to an enlarged head 55 upon which a catch 56 is formed as a bearing ledge parallel to the hub-engaging region 44. The distal tip 58 of the prong 52 is narrower than the head 55 upon which the catch 56 is formed. A reinforcing brace 60 is located on the radial inner side of the prong 52, and an opening 62 is defined in the structure of each retaining member 12 and 14 radially outwardly and adjacent the base of a proximal stem 54 of the prong 52.

Diametrically opposite each prong 52 there is a latching member 64 projecting outwardly from the hub-engaging region 44. The latching member 64 is a hollow, boxlike structure that forms a hollow plug or key which fits into one of the truncated sector-shaped cavities in the hub 16. The latching member 64 is has an opening 66 at its base, and is formed with a pair of a radially outwardly extending, diverging side walls 68 and 70, opposing, radial inner and outer end walls 72 and 74, respectively, and a flat, truncated pie shaped top 76. Each of the hollow plugs or boxes 64 is formed as a laterally enclosing structure in which the end walls 72 and 74 extend out from each of the flat plates forming the hub-engaging regions 44. The radially inner end wall 72 is flat, while the radially outer wall 74 is arcuately formed at a radius centered on the axis of rotation 17.

Each of the film retaining members 12 and 14 is provided with a hollow, central cylindrical locator post 88 that is centered on the axis of rotation 17 and which has a keyed central axial aperture 90 defined therethrough. Each locator post 88 is one-half of the height of the hub core 28 and fits snugly into the cylindrical opening through the center of the core 28 of the hub 16. The locator posts 88 are located midway between the prongs 52 and the latching members 64 on their respective film retainers.

Each hollow, boxlike member 64 that projects out from a hub-engaging region 44 has an opening 79 in its top 76. The radially outer edge 80 of the top 76 adjacent the opening 79 forms a lip that serves as a latch for the catch 56 on the prong 52 of the opposing laterally confining retaining member.

The projecting latching member 64 and the prong 52 on each of the film retainers 12 and 14 are located diametrically opposite each other on the hub-engaging region 44 thereof. The box shaped latching member 64 and the prong 52 project perpendicularly out from the hub-engaging region 44. The pair of radially outwardly diverging side walls 68 and 70 are located on the opposing sides of the latch lip 80. The radial inner and outer box or key end walls 72 and 74, together with the radially outwardly diverging side walls 68 and 70, form a lateral enclosure that has the cross-sectional shape of a truncated arcuate sector of a circle. The latch lip formed by the edge 80 is located at the same radial distance from the axis of rotation 17 as the catch 56 of the prong 52 when the prong 52 is in an undeflected condition.

The radially projecting latch lip 80 is oriented parallel to the flat portion of the retaining member from which it is formed and on which it is located. Each latch lip 80 extends transversely and is located between the radially outwardly diverging side walls 68 and 70 of the respective latching member 64 on which it is formed.

The prongs 52 both have a length less than the distance between the opposing edges 24 and 26 of the hub 16. Therefore, when the components members of the film reel 10 are releaseably engaged together, the distal tips 58 of the prongs 52 are below the planes of the exterior surfaces of the film retainers 12 and 14 but are accessible for manual manipulation to disengage the catches 56 from the latch lips 80. The distal prong tips 58 are accessible for resilient deflection of the prongs 52 from the exterior sides of the retainers 12 and 14 through the openings 66 at the bases of the hollow projecting keys or boxes formed by the latching members 64.

As best illustrated in FIG. 5, the prong 52 of each retainer extends through the opening 36 in a hub web 34 and through the latching projection box top 76 of the other retainer and terminates short of the latching projection box base. The prong catches 56 are releaseably engaged with the latch lips 80 of the latching projections 64. This engagement occurs when the hub 16 is located between the hub-engaging regions 44 of the film retainers 12 and 14, and the hub-engaging regions 44 of the film retainers 12 and 14 are pressed toward each other and into contact with the opposing edges 24 and 26 of the hub 16 located therebetween.

The prongs 52 each have a length greater than one-half but less than the entire distance between the opposing edges 24 and 26 of the hub 16 so that the distal tips 58 of the prongs 52 pass through apertures 36 in a diametrically opposed pair of the webs 34. A user can thereby insert a finger into the base opening 66 and resiliently flex each prong 52 radially outwardly.

The latching lips 80 are formed as radially inwardly directed portions of the flat tops 76 of the plugs or boxes 64 at the latching opening apertures 79 formed therein. The outer surfaces of the flat tops 76 of the latching projection 64 reside in face-to-face contact with adjacent surfaces of the aligned webs 34 of the hub 16 when the hub 16 is positioned between the hub-engaging regions 44 of the retaining members 12 and 14 and when the catches 56 are engaged with the latch lips 80.

Each radial outer latching projection end wall 74 is arcuately curved to conform to the curvature of the inside surface 22 of the hub rim 18. The outer, latching projection end walls 74 reside in contact with the inside surface 22 of the hub rim 18 when the prong catches 56 are engaged with the latch lips 80 located between the hub-engaging regions 44 of the film retainers 12 and 14.

The operation of coupling and uncoupling the film retainers 12 and 14 and the hub 16 is illustrated in FIGS. 1, 4, and 5. In FIG. 4 the hub 16 is shown resting atop the hub-engaging region 44 of the film retainer 14. The apertures 36 in the stiffening web 34 are large enough and are positioned in alignment with the prongs 52, so that when the film retainer 12 is pressed toward the film retainer 14, as illustrated in FIG. 5, the prongs 52 project through the apertures 36 in the pair of diametrically opposed stiffening webs 34 that are located ninety degrees offset from the film insertion slot 40. The stiffening webs 34 are oriented perpendicular to and intersect at least some of the radial partitions 32 to bisect the truncated, arcuate sectors located therebetween. The flat tops 76 of the hollow keys or projecting member 64 contact the aligned stiffening webs 34 when the catches 56 engage the latch lips 80.

When the hub 16 is positioned in contact with the hub-engaging region 44 of one of the film retainers, such as the laterally confining retaining member 14 as illustrated in FIG. 4, the centering post 88 of the retaining member 14 ensures that the hub 16 is coaxially centered on the retaining member 14. In this position the radially outer surface 74 of the latching projection 64 extending outwardly from the hub-engaging region 44 of the film retainer 14 resides in contact with the inner surface 22 of the hub rim 18.

There is an overlapping clearance between the apertures 36 in the stiffening webs 34 and the apertures 79 in the outwardly projecting latching members 64 so that the prongs 52 can be inserted through them. The distal ends of the prongs 58 are pushed through the apertures 36 and beyond the stiffening webs 34. The heads 55 of the prongs 52 preferably include inclined cam surfaces that ride past the latch lips 80 to resiliently bend the prong stems 54 so that the distal ends 58 of the prongs 52 flex radially inwardly until the catches 56 clear the latch lips 80 of the opposing film retainer. Once the catch 56 clears the underside of the top 76 of the opposing film retainer, the resiliency of the prong 52 causes it to snap back into perpendicular alignment relative to the hub-engaging region 44 from which it extends. The catch 56 thereof is thereby engaged with the latch lip 80 of the other film retainer.

It can be seen in FIG. 5 that when the catches 56 are engaged with the latch lips 80, the latching projections 64 fit snugly into the truncated sector-shaped openings defined in the hub 16 between adjacent radial spoke partitions 32, the inner wall 22 of the rim 18, and the outer wall of the core 28. Because of the snug fit of the latching projection 64 into these openings in the hub 16, there can be no significant relative rotation between either of the film retainers 12 and 14 and the hub 16 as long as the catches 56 are engaged with the latch lips 80. Since both of the film retainers 12 and 14 are substantially immobilized from rotation relative to the hub 16, they are substantially immobilized from any rotational movement relative to each other as well.

As evident in FIG. 5, in particular, the distal tips 58 of the prong 52 are accessible through the base openings 66 of the latching projections 64. That is, a user can disengage the catch 58 on a prong 52 from the opposing latching lip 80 on the projection 64 by inserting a finger into the pentagon shaped base opening 66 of a latching projection 64. The user then presses radially inwardly on the distal tip 58 of the prong 52, while pulling the peripheral rims 46 of the film retainers 12 and 14 apart from each other. These applied forces cause the catch 56 to disengage from the latch lip 80. While maintaining the peripheral portions 46 of the film retainers 12 and 14 biased lightly apart, the user then repeats the disengagement of the other prong 52 from engagement with the other latching projection 64. The film retainers 12 and 14 then separate from each other as illustrated in FIG. 1.

Undoubtedly, numerous variations and modifications of the invention will become readily apparent to those familiar with them motion picture film reels having separable components. For example, a reel can be constructed wherein the catches and distal ends of the prongs are configured to be flexed radially outwardly for disengagement, or even flexed in an angular direction for disengagement. Also, the structure of the latching member is 64 does not have to from a complete lateral enclosure, as long as the radially outwardly diverging side walls 68 and 70 are present. Accordingly, the scope of the invention should not be construed as limited to the specific embodiment depicted and described, but rather is defined in the claims appended hereto.

I claim:

1. A motion picture reel having an axis of rotation and formed of separable and releaseably engageable components including:

a pair of laterally confining retaining members each including a flat portion that defines a central, hub-engaging region, said axis of rotation extending through the center of said hub-engaging region, an intermediate portion extending outwardly from said hub-engaging region, and a retainer rim having a circular perimeter concentrically surrounding said hub-engaging region, and a resilient prong spaced radially from said axis of rotation and projecting out from said hub-engaging region and including a catch thereon, and a latching member projecting out from said hub-engaging region and located diametrically opposite said prong and defining an engageable latch at the same radial distance from said axis of rotation as said prong and also a pair of radially outwardly diverging side walls located on opposing sides of said latch, and a hub with opposing edges and having a rim with a cylindrical outer surface, a central core and a plurality of radial partitions forming spokes between said core and said rim and dividing the space therebetween into a plurality of truncated, arcuate sectors, wherein when said hub is positioned between said a hub-engaging regions of said retaining members and said retaining members are rotated relative to each other about said axis of rotation one hundred and eighty degrees and pressed into contact with said opposing edges of said hub with said prongs directed toward said latching members, said catches respectively engage said latches and said side walls of said latching members fit between and contact a diametrically opposed adjacent pair of said radial partitions within said hub.

2. A motion picture film reel according to claim 1 wherein said latching members are each formed as hollow plugs, and said engageable latches are each formed as a radially projecting lip parallel to said flat portion of said retaining member on which it is located and said radially projecting lip extends transversely and is located between said radially outwardly diverging side walls of said latching member.

3. A motion picture film reel according to claim 2 wherein each of said radially projecting lips projects toward said axis of rotation.

4. A motion picture film reel according to claim 2 wherein each of said hollow plugs is formed as a laterally enclosing structure in which a pair of radial inner and radial outer end walls extend out from each of said flat portions and between said radially outwardly diverging side walls at both radial inner and radial outer extremities thereof.

5. A motion picture film reel according to claim 1 wherein said latching members are both formed as hollow keys having open bases and projecting perpendicular to said hub-engaging regions and having opposing radial inner and outer ends as well as said radially outwardly diverging side walls, and said inner and outer key ends and said side walls form a lateral enclosure that has the cross-sectional shape of a truncated arcuate sector of a circle.

6. A motion picture film reel according to claim 5 wherein each of said keys is formed with a flat top having an opening therein that defines said latch.

7. A motion picture film reel according to claim 5 wherein said hub is formed with stiffening webs oriented perpendicular to and intersecting at least some of said radial partitions to bisect said truncated arcuate sectors therebetween, and said flat tops of said hollow keys contact a diametrically opposed pair of said stiffening webs when said catches engage said latches.

8. A motion picture film reel according to claim 7 wherein said diametrically opposed pair of said stiffening webs have apertures therethrough through which said prongs project.

9. A motion picture film reel according to claim 8 wherein said prongs have a length less than the distance between said opposing edges of said hub and distal tips that are accessible for manual manipulation to disengage said catches from said latches through said open bases of said hollow keys.

10. A motion picture film reel according to claim 1 wherein said retaining members are identical to each other in construction.

11. A motion picture film reel comprising separable components that are releaseably engageable together including:
a pair of film retainers each formed as a flat member with interior and exterior faces and having an outer rim with a circular perimeter and a hub-engaging region on said interior face defining an axis and centered within said rim and said hub-engaging region includes a resilient prong radially offset from said axis and extending out from said hub-engaging region and having a catch thereon, and a diametrically opposed latching projection extending out from said hub-engaging region and defining thereon a latch lip at the same radial distance from said axis as said catch and a pair of angularly spaced, radially extending side walls, and
a disc-shaped hub having a rim with opposing circular edges, a central core, and a plurality of uniformly spaced spoke partitions joining said core to said rim, and said spoke partitions are angularly spaced from each other to define a plurality of truncated circular sectors therebetween,
whereby said film retainers face each other and are angularly oriented in diametric opposition from each other so that said prong of each film retainer projects toward and is aligned with said latching projection of the other film retainer, and
said hub is positionable between said film retainers so that said prongs project between spoke partitions of said hub and between said side walls of said latching projections and are resiliently engageable with said latch lips while said side walls of said latching projections are disposed between and in face-to-face contact with said spoke partitions of said hub.

12. A motion picture film reel according to claim 11 wherein said film retainers are identical to each other in construction.

13. A motion picture film reel according to claim 12 wherein said latching projections are formed as hollow boxes, open at their bases, and laterally bounded by said radially extending side walls and radial inner and radial outer latching projection end walls extending between said side walls at both ends thereof, and tops having openings therein that define said latch lips.

14. A motion picture film reel according to claim 13 wherein said radial outer latching projection end walls are arcuately curved to conform to the curvature of said hub rim and reside in contact with inside surfaces of said hub rim when said prong catches are engaged with said latch lips of said latching projections with said hub located between said hub-engaging regions of said film retainers.

15. A motion picture film reel according to claim 11 wherein said prongs extend through said latching projection box tops and terminate short of said latching projection box bases when said prong catches are engaged with said latch lips of said latching projections with said hub located between said hub-engaging regions of said film retainers.

16. A motion picture film reel according to claim 11 to wherein said prongs have proximal ends at said hub-engaging regions of said flat members and distal ends remote therefrom, and said hub is formed with stiffening webs extending between and joining at least some adjacent spoke partitions midway between said opposing edges of said hub, and access openings are defined in at least some of said stiffening webs to permit passage of said distal ends of said prongs therethrough, and said tops of said latching projection boxes reside in contact with some of said stiffening webs when said prong catches are engaged with said latch lips of said latching projections with said hub located between said hub-engaging regions of said film retainers.

17. A motion picture film reel comprising:
a pair of retaining members each formed with a flat plate member having a central axis of rotation, a hub-engaging region surrounding said central axis, and a peripheral region having a circular outer perimeter lying beyond and surrounding said hub-engaging region, and each of said retaining members has a resilient prong with a catch formed thereon radially spaced from said axis of rotation and projecting out from said hub-engaging region, and a hollow, raised stabilizing plug having a latching opening defined therein and radially outwardly diverging side walls projecting outwardly from said hub-engaging region, and
a central hub having a cylindrical, peripheral rim, a cylindrical core, and a plurality of flat, radial spoke partitions joining said core to said rim and defining a plurality of truncated sector-shaped socket openings therebetween, whereby said retaining members are positionable with said flat plate members in mutually parallel alignment and rotated 180 degrees relative to each other about said axis of rotation so that said hub is positionable between said hub-engaging regions of said retaining members, whereupon when said retaining members are pushed toward each other to contact said hub, said plugs of said retaining members fit snugly into diametrically opposed socket openings of said hub and said catches on said prongs engage said latching openings of said plugs.

* * * * *